F. S. SILSBY.
STAND, SUPPORT, AND PROP FOR BICYCLES, MOTOR CYCLES, &c.
APPLICATION FILED JULY 7, 1910.
987,753.
Patented Mar. 28, 1911.
2 SHEETS—SHEET 1.
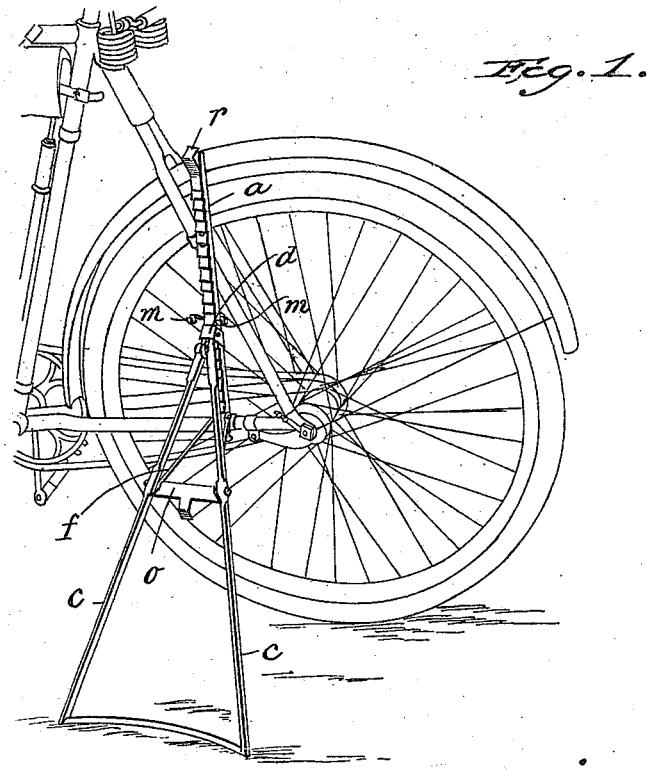
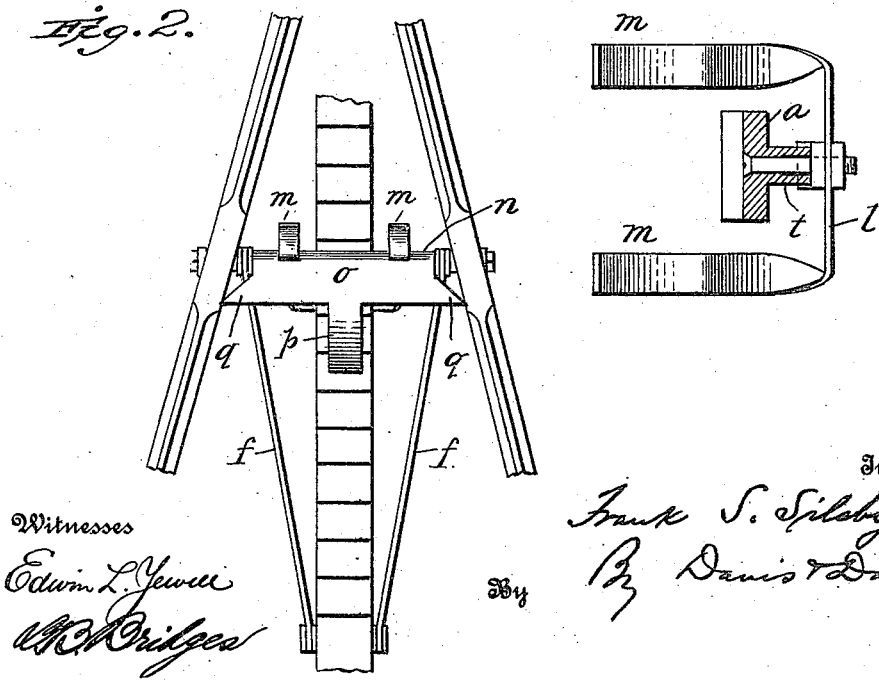

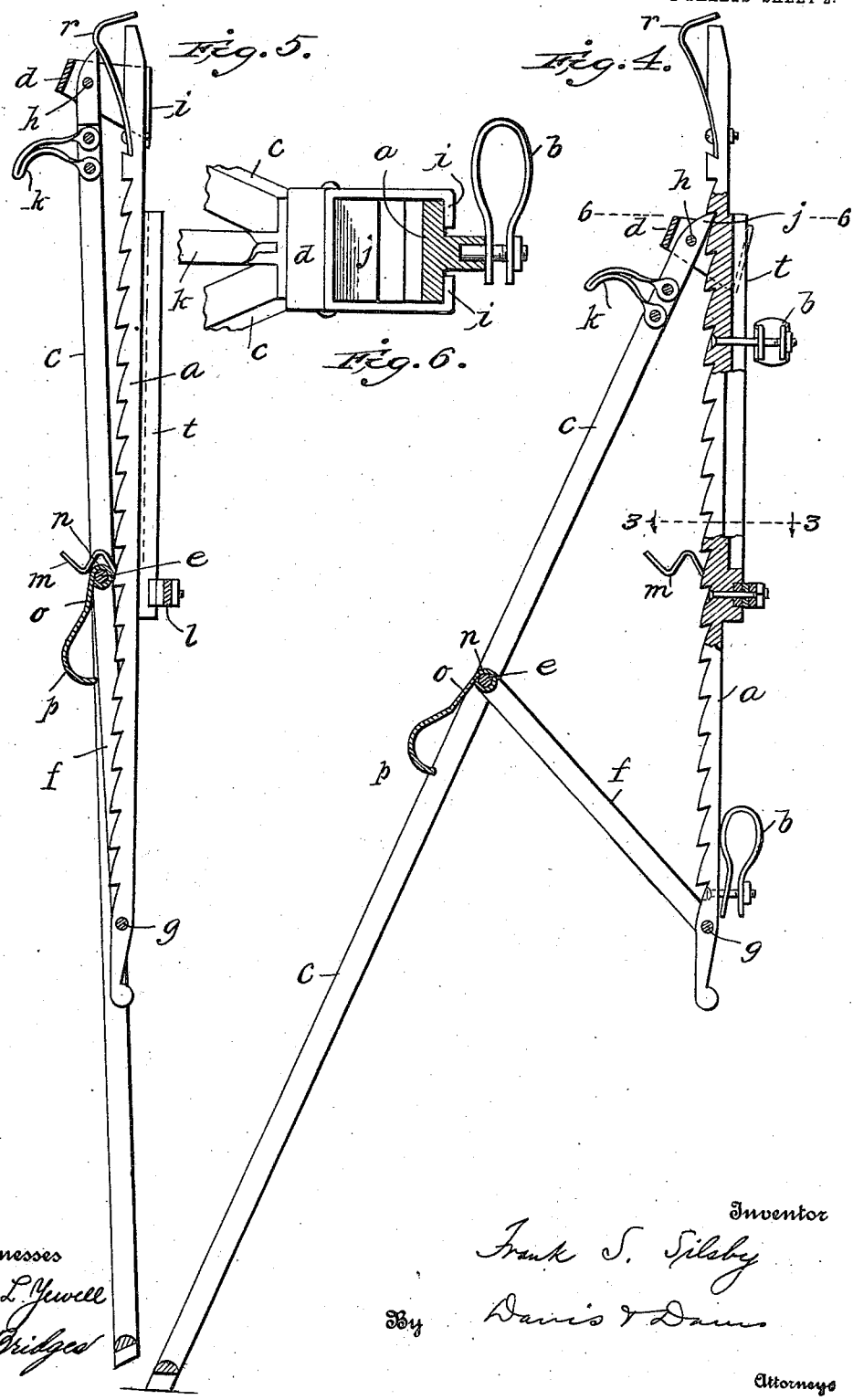

UNITED STATES PATENT OFFICE.

FRANK S. SILSBY, OF MOBILE, ALABAMA.

STAND, SUPPORT, AND PROP FOR BICYCLES, MOTOR-CYCLES, &c.

987,753.

Specification of Letters Patent. Patented Mar. 28, 1911.

Application filed July 7, 1910. Serial No. 570,868.

*To all whom it may concern:*

Be it known that I, FRANK S. SILSBY, a citizen of the United States, and a resident of Mobile, in the county of Mobile and State of Alabama, have invented certain new and useful Improvements in Stands, Supports and Props for Bicycles, Motor-Cycles, &c., of which the following is a full and clear specification, reference being had to the accompanying drawings, in which—

Figure 1 is a perspective view showing my improved support or prop adjusted to position for supporting a bicycle; Fig. 2 a detail side elevation showing the parts for locking the device in its raised or folded position; Fig. 3 a detail horizontal section through the main supporting bar taken on the line 3—3 of Fig. 4; Fig. 4 a view partly in side elevation and partly in vertical section showing the device extended for use; Fig. 5 a similar view showing the support or prop folded; and Fig. 6 a horizontal sectional view on the line 6—6 of Fig. 4.

This invention is designed to provide a simple device, efficient in construction and inexpensive to manufacture, which shall be adapted for ready attachment to a bicycle, motorcycle, or other similar vehicle, may be permanently carried thereon, and which shall enable the vehicle to be propped or supported in an upright position when the vehicle is not in use and at the same time prevent the vehicle from moving forward or backward and thus dispense with the necessity on the part of the user of finding an extraneous support against which to lean the bicycle, motorcycle, etc., as more fully hereinafter set forth.

In the drawing, $a$ designates a bar provided with ratchet teeth along its front side and having attached to its rear side suitable clamp-like clips $b$ to enable the bar to be rigidly but removably attached to the frame bars of the vehicle, each of these clips being attached to the bar by a suitable bolt and nut arrangement. Carried by this bar $a$ is a prop frame consisting of a pair of diverging legs $c$ attached together at their converged upper ends and to the bar $a$ by a clip $d$. These legs are attached together at a suitable distance from their upper ends by a rod $e$, and this rod $e$ is pivotally connected to the bar $a$ by a pair of brace bars $f$ which converge downwardly and are pivotally attached to opposite sides of the bar $a$ by a pivot bolt $g$.

The clip $d$ is approximately U-shaped and is arranged to embrace the upper ends of the legs $c$, these legs being secured pivotally between sides of the clip by means of a horizontal pivot $h$. The sides of the clip also embrace the sides of the bar $a$, and the rear ends of the side plates of clip $d$ are bent inwardly toward each other to form lips $i$. The upper ends of the legs $c$ are beveled off to form a pawl $j$ which normally engages the ratchet teeth on the front side of the bar $a$. The clip $d$ is sufficiently long to have a limited rocking motion on the pivot $h$ with respect to the bar $a$. A finger-hold $k$ is attached to the leg structure at a point near the clip $d$.

About mid-way the length of the bar $a$, on its rear side is bolted a horizontal bar or plate $l$ whose ends are bent at right angles and extended forwardly to form a pair of spring catches $m$. The horizontal rod $e$ has mounted upon it a rockable sleeve $n$ which is provided with a plate-like extension $o$, which plate extension is provided with a depending finger-piece $p$. The ends of the plate portion $o$ are provided with extensions $q$ which overlap the braces $f$ and limit the downward rocking motion of the sleeve $n$, and which when the sleeve is rotated upwardly will strike against the outer faces of the legs $c$ and thus limit the rotation of the sleeve $n$ in the opposite direction.

When the prop structure is folded up out of use, the latches $m$ engage over the sleeve $n$ and hold the prop structure up closely to the frame of the bicycle or motorcycle where it will be out of the way. The upper end of the prop structure is prevented from rattling by means of a flat spring $r$ attached to the front face of the bar $a$ at the upper end thereof and adapted to press outwardly upon the upper end of the leg structure, as shown in Fig. 5, and thus force the lips $i$ of the clip $d$ firmly against the rear face of the supporting bar $a$. To lower the propframe to its working position, it is simply necessary to engage the finger in the finger hook $p$ and raise it upwardly and thus cause the cam plate $o$ to lift both the latches $m$ off the sleeve $n$, whereupon the prop-frame will gravitate until its lower end engages the ground or floor, whereupon the pawl $j$ will swing into engagement with the nearest one of the teeth in the supporting bar and thus lock the prop-frame in its lowered position. When the prop-frame is thus lowered the clip *d* will slide freely down the supporting bar. In raising the prop-frame to a folded position, it is simply necessary to engage the finger under the finger hold *k* and pull upwardly, which act will withdraw the pawl *j* from the supporting bar and enable the clip *d* to slide freely upwardly to the position shown in Fig. 5. On the rear of the face of the bar *a* is formed a central vertical rib *t*, which is for the purpose of preventing the clip *b* from being adjusted or clamped sufficiently close to the back face of the bar *a* to prevent the clip *d* from sliding freely upwardly and downwardly past the clip *b*.

It will be understood that my device may be made of any suitable materials and with any suitable proportions and that the details of construction may be varied considerably without departing from the spirit of the invention. It will be understood also that if desired two of these devices may be used upon each vehicle, one at either side thereof, and it will be further observed that when two of these devices are thus used they may be utilized to jack up the rear wheel of the vehicle off the ground in the manner of a lifting jack, this use being especially helpful when thus used as a stand for motorcycles in testing the engines thereof.

Having thus fully described my invention, what I claim as new, and desire to secure by Letters Patent, is—

1. In combination with a toothed bar provided with means for attaching it to a vehicle, a latch carried by this bar and also an anti-rattling spring carried thereby, of a leg structure pivotally connected to the bar by braces, a tilting clip carried by the leg structure and slidingly embracing said bar, a pawl carried by the leg structure adapted to engage the aforesaid toothed bar and means for disconnecting said latch.

2. In combination with a vertical ratcheted bar and means for attaching it rigidly to a vehicle, a leg structure carrying a pawl at its upper end adapted to engage the ratchet teeth on said bar, a sliding loop slidingly and pivotally connecting said upper end to said bar, so that the leg structure may be bodily moved vertically and may be swung outwardly at its lower end and when thus swung out will cause the pawl to engage the ratchet teeth on the bar, swinging braces connecting the leg structure and the ratcheted bar at the lower end of the bar, and latching means to hold the leg structure up out of the way.

3. In combination, a ratcheted bar and means for detachably but rigidly attaching it to a vehicle frame, a leg structure having a pawl at its upper end, a tilting clip pivotally connected to the upper end of the leg structure and slidingly embracing the ratcheted bar, for the purpose set forth, a swinging brace device connecting the leg structure and the lower end of the ratcheted bar, and latching means for holding the leg structure up against the bar.

4. In combination, a bar provided with a series of ratchet teeth and means for attaching it to the frame of a vehicle, a leg structure having a pawl at its upper end and means for pivotally and slidingly connecting it to said ratcheted bar, a swinging brace device connecting the leg structure to the lower end of the bar, and a latching means consisting of a spring catch on the bar, a horizontal pin or rod on the leg structure carrying a rockable sleeve adapted to be engaged by said catch, said sleeve being provided with a finger hook and a cam plate, for the purpose set forth.

5. In combination, a bar and means for rigidly attaching it to a vehicle frame in an upright position, the front face of said bar being provided with ratchet teeth, a leg structure comprising a pair of bars converging upwardly and provided at its upper end with a pawl adapted to engage said teeth on the ratchet bar, a clip pivotally connected to the upper end of the leg structure and slidingly embracing the ratchet bar, a finger hold connected to the upper end of the leg structure, a pair of braces pivotally connected to the leg structure and converging inwardly toward the ratchet and pivotally connected to the ratchet bar at the lower end thereof, and a latching device for holding the leg structure in a folded position against the ratchet bar.

In testimony whereof I hereunto affix my signature in the presence of two witnesses this 5th day of July 1910.

FRANK S. SILSBY.

Witnesses:
S. Agee, Jr.,
A. C. Tonsmeire.